US009386274B2

(12) United States Patent
Vivekanandan et al.

(10) Patent No.: US 9,386,274 B2
(45) Date of Patent: *Jul. 5, 2016

(54) MULTIMEDIA CONFERENCE ENDPOINT TRANSFER SYSTEM

(71) Applicant: Google Inc., Mountain View, CA (US)

(72) Inventors: Janahan Vivekanandan, Los Altos, CA (US); Param Reddappagari, Redmond, WA (US); Zhengping Zuo, Sammamish, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,869

(22) Filed: Aug. 8, 2014

(65) Prior Publication Data

US 2015/0042750 A1    Feb. 12, 2015

Related U.S. Application Data

(63) Continuation of application No. 13/479,204, filed on May 23, 2012, now Pat. No. 8,830,295.

(51) Int. Cl.
*H04N 7/15* (2006.01)
*H04M 3/56* (2006.01)
*H04N 7/14* (2006.01)
(Continued)

(52) U.S. Cl.
CPC .............. *H04N 7/15* (2013.01); *H04L 12/1822* (2013.01); *H04L 65/1069* (2013.01); *H04L 65/1086* (2013.01); *H04L 65/1093* (2013.01); *H04L 65/4038* (2013.01); *H04L 65/4046* (2013.01);
(Continued)

(58) Field of Classification Search
CPC ......... H04M 3/567; H04N 7/147; H04N 7/14; H04N 7/15; H04L 65/1069; H04L 65/4046; H04L 12/1822
USPC ................... 348/14.01–14.16; 370/260–261; 709/204; 715/753
See application file for complete search history.

(56) References Cited

U.S. PATENT DOCUMENTS 6,564,380 B1    5/2003  Murphy
6,831,675 B2   12/2004  Shachar et al.
(Continued)

OTHER PUBLICATIONS

Lemon, Sumner, "Skype CEO Envisions Switching Devices During Calls", PCWorld, Jun. 15, 2010, retrieved from <http://www.pcworld.com/printable/article/id,198847/printable.html>.

(Continued)

*Primary Examiner* — Melur Ramakrishnaiah
(74) *Attorney, Agent, or Firm* — McDermott Will & Emery LLP

(57) ABSTRACT

A system for providing a trusted peer-based information verification system may include one or more processors and a memory. The one or more processors may provide a multimedia conference to participant devices, and may receive a request to transfer a session of the multimedia conference of a participant device that is characterized by a first multimedia conference capability. The one or more processors may provide a list of target devices associated with the participant device to the participant device, and may receive an indication of a target device from the participant device. The one or more processors may transfer the session of the multimedia conference from the participant device to the target device, wherein the target device is characterized by a second multimedia conference capability that is different than the first multimedia conference capability of the participant device.

20 Claims, 5 Drawing Sheets

(51) Int. Cl.
H04L 29/06 (2006.01)
H04L 12/18 (2006.01)

(52) U.S. Cl.
CPC ............ *H04L 65/605* (2013.01); *H04M 3/567* (2013.01); *H04N 7/14* (2013.01); *H04N 7/147* (2013.01)

(56) References Cited

U.S. PATENT DOCUMENTS

| | | |
|---|---|---|
| 6,976,055 B1 | 12/2005 | Shaffer et al. |
| 2002/0027597 A1 | 3/2002 | Sachau |
| 2002/0103864 A1 | 8/2002 | Rodman et al. |
| 2004/0030749 A1 | 2/2004 | Bowman-Amuah |
| 2006/0092269 A1 | 5/2006 | Baird et al. |
| 2006/0149818 A1* | 7/2006 | Odell et al. ............... 709/206 |
| 2008/0089307 A1* | 4/2008 | Tuijn ............. H04L 29/06027 370/342 |
| 2008/0151885 A1 | 6/2008 | Horn et al. |
| 2008/0155062 A1 | 6/2008 | Rabold et al. |
| 2008/0273079 A1 | 11/2008 | Campbell et al. |
| 2009/0210536 A1* | 8/2009 | Allen et al. ............... 709/227 |
| 2009/0284579 A1 | 11/2009 | Knaz |
| 2009/0285130 A1* | 11/2009 | Knaz ............................ 370/260 |
| 2010/0149302 A1 | 6/2010 | Malik |
| 2010/0149307 A1 | 6/2010 | Iyer et al. |
| 2011/0040836 A1 | 2/2011 | Allen et al. |
| 2011/0066924 A1 | 3/2011 | Dorso et al. |
| 2011/0249073 A1 | 10/2011 | Cranfill et al. |
| 2011/0249079 A1 | 10/2011 | Santamaria et al. |
| 2011/0270933 A1 | 11/2011 | Jones et al. |

OTHER PUBLICATIONS

"The Avaya Desktop Video Device with the Avaya Flare Experience", Avaya Fact Sheet, Sep. 2010.

"VidyoConferencing Administrator's Guide", Vidyo—Personal Telepresence, 2011, Document Version 2.1-D.

"HDFaces Video Conferencing", GoToMeeting—Global Customer Support, last viewed Mar. 30, 2012, retrieved from <http://support.citrixonline.com/GoToMeeting/all.sub.--files/GTM150001->.

Akkuet al., "Peer-to-peer multipoint video conferencing with layered video", Journal of Network Computer Applications, 2011, pp. 137-150, vol. 34.

"Microsoft Lync.TM. How-to Guide", retrieved from <http://ecenter.custhelp.com/app/answers/detail/a.sub.--id/1552> on Mar. 20, 2014, 17 pages.

* cited by examiner

MULTIMEDIA CONFERENCE ENDPOINT TRANSFER SYSTEM

CROSS-REFERENCE TO RELATED APPLICATIONS

This application is a continuation of U.S. patent application Ser. No. 13/479,204, entitled "Multimedia Conference Endpoint Transfer System," filed on May 23, 2012, now issued as U.S. Pat. No. 8,830,295, which is expressly incorporated by reference herein.

TECHNICAL FIELD

The present description relates generally to device transfer systems, and more particularly, but not exclusively, to a multimedia conference endpoint transfer system.

BACKGROUND

Multiple individual users engaging in a multimedia conference may be able to view and hear one another irrespective of the users' physical locations. In this manner, multimedia conferences may allow disparately located users to participate in activities generally associated with collocated users, such as panel discussions, multi-person interviews, or classes.

In some instances, a user may initiate a multimedia conference session for participating in a multimedia conference through a first endpoint device, but may later wish to transfer the multimedia conference session to a second endpoint device. For example, a user may initiate a multimedia conference session using their work desktop computer, and the user may later wish to continue their multimedia conference session using their mobile phone. This situation may occur, for example, when a user starts a multimedia conference session at their office, and would like to continue the multimedia conference session upon leaving their office.

SUMMARY

The disclosed subject matter relates to a machine-implemented method for multimedia conference endpoint transfer. The method may include providing, using one or more computing devices, a multimedia conference to a plurality of participant devices. The method may further include receiving, using the one or more computing devices, a request to transfer a session of the multimedia conference of a participant device of the plurality of participant devices, wherein the participant device is characterized by a first multimedia conference capability. The method may further include providing, using the one or more computing devices, a list of a plurality of target devices associated with the participant device to the participant device. The method may further include receiving, using the one or more computing devices, an indication of a target device of the plurality of target devices from the participant device, wherein the target device is characterized by a second multimedia conference capability that is different than the first multimedia conference capability of the participant device. The method may further include transferring, using the one or more computing devices, the session of the multimedia conference from the participant device to the target device.

In another aspect, a machine implemented method may include initiating, using one or more first computing devices of a first device, a multimedia conference session for a multimedia conference with a plurality of participant devices, wherein the first device is characterized by a first multimedia conference capability. The method may further include providing, using the one or more first computing devices of the first device, a request to transfer the multimedia conference session. The method may further include receiving, using the one or more first computing devices of the first device and in response to the requesting, a list of a plurality of second devices to which the multimedia conference session can be transferred. The method may further include providing, using the one or more first computing devices of the first device and in response to the receiving, a selection of a second device of the plurality of second devices, wherein the second device is characterized by a second multimedia conference capability that is different than the first multimedia conference capability of the first device. The method may further include receiving, using one or more second computing devices of the second device, a request to assume the multimedia conference session initiated by the first device. The method may further include assuming, using the one or more second computing devices of the second device, the multimedia conference session initiated by the first device, wherein the assuming is performed transparently to the other of the plurality of participant devices.

The disclosed subject matter also relates to a system for multimedia conference endpoint transfer. The system may include one or more processors and a memory including instructions that, when executed by the one or more processors, cause the one or more processors to facilitate the steps of: providing a multimedia conference to a plurality of participant devices, receiving a request to transfer a session of the multimedia conference of a participant device of the plurality of participant devices, wherein the participant device is characterized by a first multimedia conference capability, providing a list of a plurality of target devices associated with the participant device to the participant device, receiving an indication of a target device of the plurality of target devices from the participant device, and transferring the session of the multimedia conference from the participant device to the target device, wherein the target device is characterized by a second multimedia conference capability that is different than the first multimedia conference capability of the participant device.

The disclosed subject matter also relates to a machine-readable medium comprising instructions stored therein, which when executed by a machine, cause the machine to perform a method for multimedia conference endpoint transfer that includes providing a multimedia conference to a plurality of participant devices. The method may further include receiving a request to transfer a session of the multimedia conference of a participant device of the plurality of participant devices, wherein the participant device is characterized by a first multimedia conference capability. The method may further include providing a list of a plurality of target devices associated with the participant device. The method may further include receiving an indication of a target device of the plurality of target devices from the participant device. The method may further include transferring the session of the multimedia conference from the participant device to the target device, wherein the target device is characterized by a second multimedia conference capability that is different than the first multimedia conference capability of the participant device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
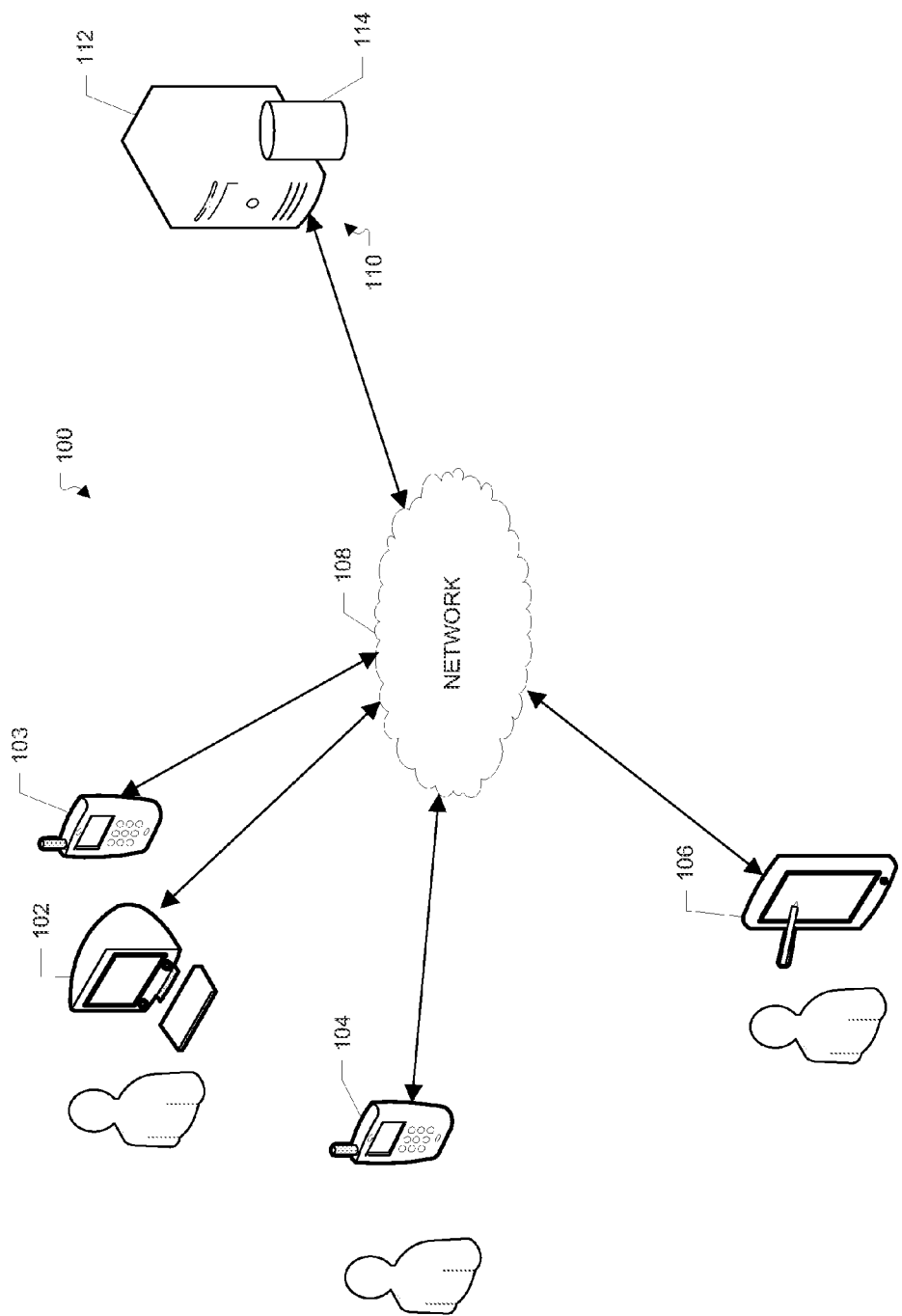
FIG. 1 illustrates an example client-server network environment that may implement a multimedia conference endpoint transfer system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

Hosted multimedia conferencing technology enables individual users located in disparate geographic locations, and operating disparate devices, e.g. devices having different operating systems, different screen resolutions, different processing capabilities, etc., to engage in a multimedia conference without the need for each user to possess expensive video conferencing equipment. For example, some users may engage in a hosted multimedia conference using web browser-enabled devices, such as devices that can provide graphical user interfaces to the users for displaying video streams corresponding to the multimedia conference, while other users may engage in the hosted multimedia conference using devices that are not web-enabled, such as an analog phone, or a mobile phone that does not support web browsing. In this manner, hosted multimedia conferencing may allow users having devices with different multimedia conference capabilities to view and/or hear one another (depending upon the capabilities of each user's device), such as in order to participate in panel discussions, multi-person interviews, or classes, irrespective of the multimedia conference capability of each user's device.

A hosting device may host a multimedia conference among multiple participants. The hosting device may be a server, one or more devices of the participants, or any combination thereof. In some instances, a participant may initiate a session for participating in the multimedia conference through a first device, but may later wish to transfer the multimedia conference session to a second device. The second device may have a different multimedia conference capability than the first device. The multimedia conference capability of a device may generally indicate whether the device is capable of providing video and/or audio streams and/or receiving video and/or audio streams. The multimedia conference capability of a device may be determined based on hardware attributes of the device, such as whether the device includes a display, a camera, a public switched telephone network interface, a packet-switched network interface, bandwidth attributes corresponding to the device, such as the uplink and/or downlink bandwidth available to the device, or generally any attributes of the device, or any external factors, that may impact a user's participation in a multimedia conference via the device.

For example, a user may initiate a multimedia conference session using a first device that is capable of providing and receiving video and audio streams, such as their work desktop computer, but the user may later wish to continue their multimedia conference session using a second device that is not capable of providing and/or receiving video and/or audio streams, such as their mobile phone or an analog telephone. In this example, the user could terminate the multimedia conference session on their work computer and initiate a second multimedia conference session using their mobile phone. However, since the transition would not be seamless, the user may miss a portion of the multimedia conference due to the time required to terminate the multimedia conference session on their work computer and initiate the second multimedia conference session on their mobile device. Furthermore, it may be disruptive and/or confusing to the other participants in the multimedia conference if the user terminates their multimedia conference session and then initiates a second multimedia conference session.

In another example, the user may avoid missing the portion of the multimedia conference by initiating the second multimedia conference session from their mobile phone before terminating the multimedia conference session on their work computer. However, since the transition would still not be seamless, the other participants in the multimedia conference may be confused by the user having two simultaneous multimedia conference sessions active through two separate devices.

Furthermore, in some instances the multimedia conference may be open to the public, e.g. any user can join the multimedia conference, but capacity controlled, e.g. only a maximum number of users can participate in the multimedia conference at any given time. For example, a multimedia conference with a celebrity may be open to the public, but capacity controlled, such that only a limited number of users may participate in the multimedia conference with the celebrity. In this example, if the multimedia conference has reached its maximum capacity, the user may not be able to initiate a second multimedia conference session from their mobile phone while having an active multimedia conference session through their work computer, since the hosting device may identify the second multimedia conference session as a separate session. Similarly, if the user was participating in a capacity-controlled multimedia conference that was at its maximum capacity, and the user terminated the multimedia conference session on their work computer, another user may join the multimedia conference before the user is able to initiate a second multimedia conference session from their mobile device. In this example, since the multimedia conference would be at its maximum capacity after the other user joined, the user would be not be able to initiate the second multimedia conference session from their mobile phone.

In a multimedia conference endpoint transfer system, a participant in a multimedia conference may request that the hosting device seamlessly transfer their multimedia conference session to a target endpoint device, such as another computer, mobile device, analog phone, or generally any endpoint device that is capable of connecting to the multimedia conference. In response to the user's request, the hosting device may provide the user with a list of active target devices to which the user's multimedia conference session can presently be transferred. For example, if the user is presently participating in the multimedia conference through a device that supports a graphical user interface, the hosting device may provide a graphical list of active target devices to which the user's multimedia conference session can presently be transferred. Alternatively, or in addition, if the user is presently participating in the multimedia conference through a device that does not support a graphical user interface, such as an analog phone without a display, the hosting device may provide the list of active target devices through an interactive response system, such as an interactive voice response system.

The hosting device may generate the list of active target devices to which the user's multimedia conference session can presently be transferred based on one or more devices that are associated with the user, such as devices that the user previously registered with the hosting device, or devices that the user previously registered with an application hosted by the hosting device, such as a hosted multimedia conferencing application. The hosting device may continuously assess the state and/or multimedia conference capabilities of the registered devices, such as whether the devices are active or online, and/or whether the devices are capable of providing and/or receiving video streams and/or audio streams. For example, the hosting device may actively ping the registered devices, or may otherwise actively contact the registered devices, to assess the state and/or capabilities of the registered devices. Accordingly, based on the state of each of the registered devices, the hosting device can generate a list of active target devices to which the user's multimedia conference session can presently be transferred.

In response to receiving the list of active target devices from the hosting device, the user may select a target device to which they would like to transfer their multimedia conference session. The user's device may transmit an indication of the user's selection to the hosting device. Alternatively, or in addition, if the user would like to transfer their multimedia conference session to a device that is not included in the list provided by the hosting device, the user may provide a device identifier for contacting the target device to which they would like to transfer their multimedia conference session, such as a telephone number, an internet protocol (IP) address, or generally any identifier that can be used by the hosting device to contact the target device.

Upon receiving the selection of one of the target devices from the user, the hosting device may determine the multimedia conference capability of the target device. For example, the hosting device may determine the communication interfaces that are available and/or active on the target device, such as a public switched telephone network interface, a packet-switched network interface, or other communication interfaces. The hosting device may then provide a transfer request message to the target device through a communication mechanism determined from the communication interfaces available on the target device. For example, the hosting device may transmit a data message over a packet-switched network, if the target device includes a packet-switched network interface. Alternatively, or in addition, if the target device only includes a public switched telephone network interface, the hosting device may initiate a telephone call with the target device. Alternatively, or in addition, the hosting device may also communicate an indication to the user's initial device indicating that the hosting device is attempting to establish a connection with the target device.

In response to receiving the transfer request message from the hosting device, the target device may establish a connection with the hosting device, and/or may send an acknowledgement message to the hosting device. For example, the acknowledgement message may indicate that the target device has received the transfer request message, and that the target device has alerted the user to the transfer request, such as by displaying an alert message to the user, or providing an audible alert to the user.

Upon receiving the alert, the user may accept the transfer request on the target device, such as by clicking an "accept" button on a display, by pressing a button on a telephone keypad, by providing a voice command, or generally via any input mechanism capable of indicating that the user has accepted the transfer. If the user indicates that the transfer is accepted, the target device may communicate the user's acceptance to the hosting device. Upon receiving the user's acceptance from the target device, the hosting device may identify the multimedia conference capability of the target device, e.g. whether the target device can provide and/or receive video and/or audio streams. The hosting device may then adjust parameters of the multimedia conference session in accordance with the multimedia conference capability of the target device, such as the communication interfaces available on the target device, whether the device can provide and/or receive audio and/or videos streams, etc.

The hosting device may adjust the endpoint device associated with the multimedia conference session to reflect the target device, in order to transfer the multimedia conference session to the target device in a virtually seamless manner. The target device may then assume the multimedia conference session from the user's initial device. Since the hosting device manages the transfer of the multimedia conference session to the target device, the hosting device can provide a transfer that is virtually seamless and transparent to the other participants in the multimedia conference. In this regard, the user's initial device may be automatically disconnected from the multimedia conference when the user's multimedia conference session is transferred to the target device.

Alternatively, or in addition, the hosting device may allow the user to indicate whether they would like to accept the transfer on the target device by assuming the multimedia conference session from the initial device, or to accept the transfer on the target device and maintain the multimedia conference session on the initial device. If the user decides to accept the transfer on the target device and maintain the multimedia conference session on the initial device, the hosting device can identify that the multiple multimedia conference sessions belong to the same user, since to the hosting device manages the transfer. As such, the hosting device may allow the user to maintain multimedia conference sessions on both the initial device and the target device, even for a capacity controlled multimedia conference that has reached its capacity.

Alternatively, or in addition, if the user's initial device and the target device have different multimedia conference capabilities, the hosting device may notify the other participants of the transfer. For example, if the initial device of the user is capable of providing a video stream, such as a computer with a camera, but the target device of the user is not capable of providing a video stream, such as an analog phone, the other participants in the multimedia conference may no longer receive a video stream for the user. In this instance, the hosting device may provide a notification to the other participants that the user has transferred their multimedia conference session to a device that is not capable of providing a video stream, and therefore the participants will no longer receive a video stream for the user. In this manner, the other participants may be made aware that the loss of the video stream for the user is not due to any technical problems with their endpoint device or the hosting device. Conversely, if the user's initial device is not capable of providing a video stream, but the target device is capable of providing a video stream, the hosting device may provide a notification to the other participants that the user has transferred their multimedia conference session to a device that is capable of providing video, and therefore a video stream is now available for the user.

Alternatively, or in addition, the user's initial device may establish a direct connection with the target device, such as a peer-to-peer connection, and may handoff the multimedia conference session to the target device through the peer-to-peer connection. In this example, the initial device and the target device may provide status notifications regarding the progress of the transfer to the hosting device, and/or the initial device and/or target device may exchange control messages with the hosting device. In this manner, the hosting device may still manage the transfer of the multimedia conference session in order to provide a seamless transfer that is transparent to the other participants in the multimedia conference.

For explanatory purposes, the endpoint transfer system described herein is discussed in the context of a multimedia conferencing service. However, the endpoint transfer system may be implemented in any hosted service, such as a streaming video service, an online gaming service, or generally any service for which a seamless device transfer is desirable. For example, a user participating in a multi-player online game on their home desktop computer through a online gaming service, or viewing a streaming video through a streaming video service, may wish to transfer their online game session, or their streaming video session, to another device, such as a tablet or other mobile device, for example if the user needs to leave their home. In this example, the server hosting the online gaming service, streaming video service, or any similar service, may perform/manage the transfer of the user's online game session, streaming video session, or any other session, in the same manner as described herein for a multimedia conference session.

II. Example Client-Server Network Environments for Providing a Multimedia Conference Endpoint Transfer System FIG. 1 illustrates an example client-server network environment which may implement a multimedia conference endpoint transfer system. Network environment 100 may include a number of electronic devices 102, 103, 104, 106 communicably connected to server 110, such as by network 108. In another example, electronic devices 102, 103, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 103, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used to for displaying a web page or web application. In the example of FIG. 1, electronic device 102 is depicted as a desktop computer, electronic devices 103, 104 are depicted as smartphones, and electronic device 106 is depicted as a tablet device.

In one example, server 110 includes one or more processing devices 112 and data store 114. The one or more processing devices 112 execute computer instructions stored in data store 114, for example, to provide a multimedia conference endpoint transfer system to one or more of electronic devices 102, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 103, 104, 106, and server 110 may be facilitated through the Hypertext Transfer Protocol ("HTTP") communication protocol. Other communication protocols may also be used including, for example. Extensible Messaging and Presence Protocol (XMPP) communication, for some or all communications between electronic devices 102, 103, 104, 106 and server 110. In another example, electronic devices 102, 103, 104, 106 may be in communication with one another without communicating with server 110.

Users interacting with electronic devices 102, 103, 104, 106 may participate in a multimedia conference. The phrase "multimedia conference" as used herein encompasses its plain and ordinary meaning and, if not otherwise included in its plain and ordinary meaning, may also refer to a video conference between two or more of electronic devices 102, 103, 104, 106, where each electronic device 102, 103, 104, 106 transmits a video and/or audio stream, and each electronic device 102, 103, 104, 106 receives a video and/or audio stream from at least one other of electronic devices 102, 103, 104, 106. Accordingly, electronic devices 102, 103, 104, 106, may include, or may be coupled to, a camera, or other device for capturing video and/or audio, and may include an output device for viewing video and/or hearing audio.

Electronic devices 102, 103, 104, 106 may also be referred to as endpoint devices. The phrase "endpoint device" as used herein encompasses its plain and ordinary meaning and, if not otherwise included in its plain and ordinary meaning, may also refer to any device that is capable of participating in a multimedia conference, such as any device that is capable of providing an audio stream and/or a video stream to another device and/or receiving an audio stream and/or a video stream from another device.

In one example electronic devices 102, 103, 104, 106 may establish a multimedia conference session with server 110 in order to participate in a multimedia conference. The phrase "multimedia conference session" as used herein encompasses its plain and ordinary meaning and, if not otherwise included in its plain and ordinary meaning, may also refer to interactions between electronic devices 102, 104, 106 and server 110 with regards to a multimedia conference, and any data, state information, and/or control information associated with the interactions.

In one example, if users interacting with electronic devices 102, 103, 104, 106 are participating in a multimedia conference hosted by server 110, electronic devices 102, 103, 104, 106, may transmit audio streams and/or video streams to server 110. The phrase "hosting device" as used herein encompasses its plain and ordinary meaning and, if not otherwise included in its plain and ordinary meaning, may also refer to a device that is hosting a multimedia conference. The hosting device, such as server 110, may transmit the audio stream and/or video stream of each electronic device 102, 103, 104, 106 to the other electronic devices 102, 103, 104, 106.

In operation, server 110 may provide a multimedia conference to electronic devices 102, 104, 106 such as by hosting the multimedia conference. Electronic devices 102, 104, 106 may each establish a multimedia conference session with server 110, for purposes of participating in the multimedia conference. A user interacting with one of electronic devices 102, 104, 106, such as electronic device 102, may transmit a request to server 110 indicating that the user would like to transfer their multimedia conference session to another device.

In response to receiving the transfer request from electronic device 102, server 110 may retrieve and/or generate a list of active target devices to which the user may transfer their multimedia conference. In one example, server 110 may maintain a list of active target devices for each user participating in the multimedia conference. Server 110 may continually determine the state and multimedia conference capabilities of the target devices of each of the users in order to verify that each target device is active, and/or in order to determine the multimedia conference capability of each target device. The process of maintaining a list of active target devices for each of the users is discussed further in FIG. 4 below.

The phrase "multimedia conference capability" as used herein encompasses its plain and ordinary meaning and, if not otherwise included in its plain and ordinary meaning, may also refer to any attribute of a device that may be used while participating in a multimedia conference, such as whether the device includes a display, a camera, a public switched telephone network interface, a packet-switched network interface, processing resources of the device, or any other attribute, and/or any external factor that may affect the device's participation in a multimedia conference, such as channel conditions between the device and server 110, the uplink and/or downlink bandwidth available to the device, or any other external factor.

Server 110 may provide the list of active target devices to electronic device 102. The user interacting with electronic device 102 may select an active target device from the list, such as electronic device 103. Electronic device 102 may communicate the user's selection to server 110. The process of requesting a transfer of a multimedia conference session is discussed further in FIG. 3 below. Server 110 may then manage the transfer of the multimedia conference session from electronic device 102 to electronic device 103, such that the transfer is seamless and transparent to the other users participating in the multimedia conference. The process of transferring a multimedia conference session from a first endpoint device, such as electronic device 102, to a second endpoint device, such as electronic device 103, is discussed further in FIG. 2 below.

III. Example Processes for a Multimedia Conference Endpoint Transfer System

Figure 2:
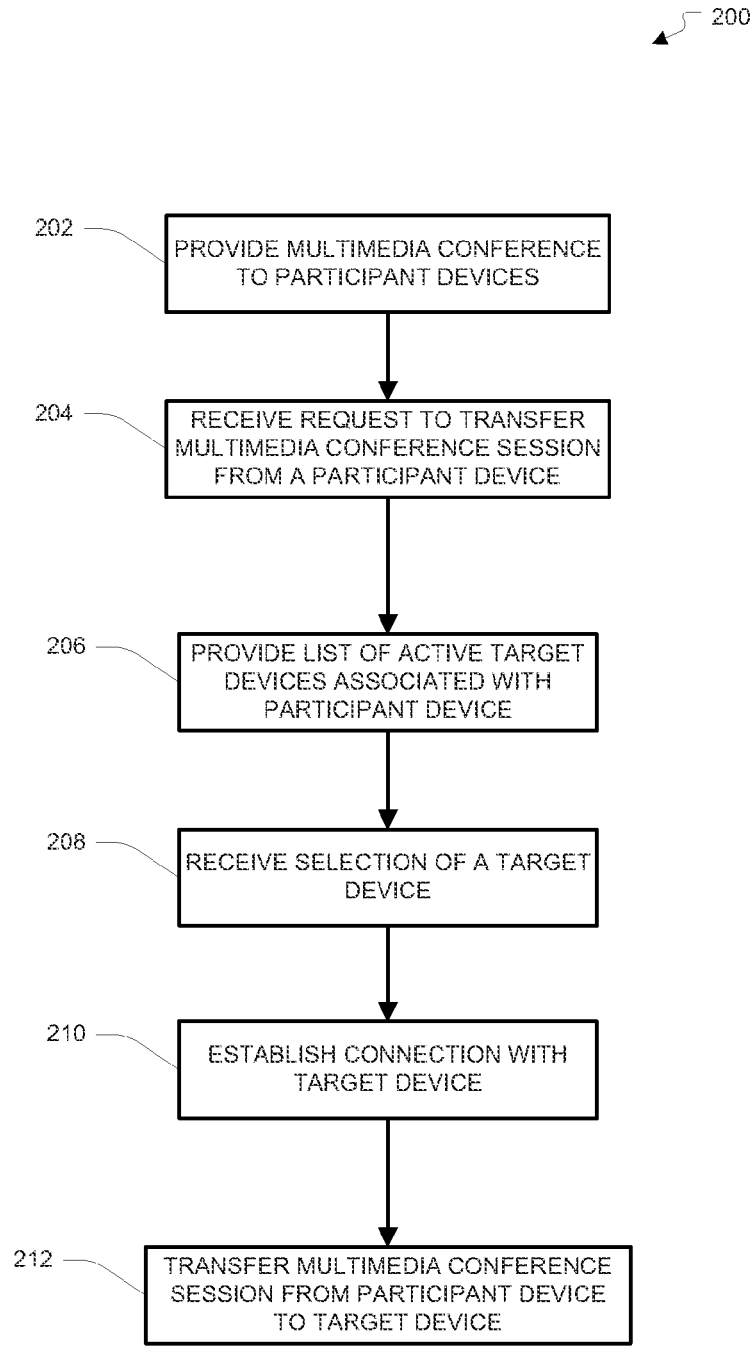
FIG. 2 illustrates a flow diagram of an example process for a multimedia conference endpoint transfer system.

FIG. 2 illustrates a flow diagram of an example process 200 for a multimedia conference endpoint transfer system. In block 202, a hosting device, such as server 110, provides a multimedia conference, or other hosted service, to one or more participant devices, such as electronic devices 102, 104, 106. For example, electronic devices 102, 104, 106 may each establish an individual multimedia conference session with server 110. Each of electronic devices 102, 104, 106 may provide its multimedia conference capability to server 110 while establishing a multimedia conference session, or server 110 may otherwise determine the multimedia conference capability of each of electronic devices 102, 104, 106. Server 110 may store the multimedia conference capability of each of electronic devices 102, 104, 106, such as in data store 114. Server 110 may then receive audio and/or video streams from one or more of electronic devices 102, 104, 106, depending on the multimedia conference capability of each of electronic devices 102, 104, 106. Server 110 may provide the audio and/or video stream received from each of electronic devices 102, 104, 106 to one or more of the other electronic devices 102, 104, 106, depending on the multimedia conference capability of each of electronic devices 102, 104, 106.

In block 204, server 110 receives a request from a participant device, such as electronic device 102, to transfer its multimedia conference session to another endpoint device. In block 206, in response to receiving the transfer request, server 110 provides a list of active target devices associated with electronic device 102. The list of active target devices may represent devices to which the multimedia conference session of electronic device 102 may presently be transferred. For example, if electronic device 102 includes a graphical user interface, server 110 may provide a graphical list of active target devices to which the multimedia conference session of electronic device 102 may presently be transferred. Alternatively, or in addition, if electronic device 102 does not support a graphical user interface, such as an analog phone without a display, server 110 may provide the list of active target devices to electronic device 102 through an interactive response system, such as an interactive voice response system.

In one example, the list of devices associated with electronic device 102 may include devices that the user interacting with electronic device 102 previously registered with server 110, or devices that the user previously registered with an application hosted by server 110, such as a hosted multimedia conferencing application. For example, the list of target devices provided to electronic device 102 may include electronic device 103. Server 110 may continuously assess the state and/or capabilities of the registered devices, such as whether the devices are active or online, and/or whether the devices are capable of providing and/or receiving video streams and/or audio streams. For example, server 110 may actively ping the registered devices, or may otherwise actively contact the registered devices, to assess the state and/or capabilities of the registered devices. The process of maintaining a list of active target devices is discussed further in FIG. 4 below.

In block 208, server 110 receives a selection of a target device from electronic device 102. For example, server 110 may receive a selection of one of the listed active target devices, such as electronic device 103. Alternatively, or in addition, server 110 may receive an identifier of a target device that is not included on the list of active target devices. For example, server 110 may receive a telephone number associated with a target device, an internet protocol (IP)

address associated with a target device, or generally any identifier that can be used by server 110 to contact the target device.

In block 210, server 110 establishes a connection with the selected target device, such as electronic device 103. In order to establish a connection with electronic device 103, server 110 may determine the multimedia conference capability of electronic device 103, such as the communication capability of electronic device 103. For example, server 110 may determine the communication interfaces that are available and/or active on electronic device 103, such as a public switched telephone network interface, a packet-switched network interface, or other communication interfaces.

Server 110 may then provide a transfer request message to electronic device 103 through a communication mechanism determined from the communication interfaces available on electronic device 103. In one example, server 110 may transmit a data message over a packet-switched network, if electronic device 103 includes a packet-switched network interface. Alternatively, or in addition, if electronic device 103 only includes a public switched telephone network interface, server 110 may initiate a telephone call with electronic device 103. Alternatively, or in addition, server 110 may also transmit an indication to electronic device 102 that indicates that server 110 is attempting to establish a connection with electronic device 103. Upon establishing a connection with electronic device 103, server 110 may move to block 212.

In block 212, server 110 transfers the multimedia conference session from the participant device, such as electronic device 102, to the target device, such as electronic device 103. Prior to initiating the transfer, server 110 may identify the multimedia conference capability of electronic device 103, e.g. whether electronic device 103 can provide and/or receive video and/or audio streams. Server 110 may then adjust parameters of the multimedia conference session of electronic device 102 in accordance with the multimedia conference capability of electronic device 103, such as the communication interfaces available on electronic device 103, whether electronic device 103 can provide and/or receive audio and/or videos streams, etc. Server 110 may then change the endpoint device associated with the multimedia conference session of electronic device 102 to electronic device 103, in order to transfer the multimedia conference session to electronic device 103 in a virtually seamless manner. Upon changing the endpoint device to electronic device 103, server 110 may redirect the audio and/or video streams of the other participants in the multimedia conference to electronic device 103, rather than electronic device 102. Server 110 may also receive audio and/or video streams from electronic device 103, rather than electronic device 103. In this regard electronic device 102 may be disconnected from the multimedia conference when the transfer is completed.

Alternatively, or in addition, server 110 may associate both electronic devices 102, 103 with the multimedia conference session. In this instance, server 110 may send the audio and/or video streams of the other participants to both electronic devices 102, 103. Thus, the user associated with electronic devices 102, 103 may access the multimedia conference from either, or both, electronic devices 102, 103. Since server 110 is aware that electronic devices 102, 103 are both associated with the same user, electronic devices 102, 103 may not appear as separate devices to the other participants in the multimedia conference. Alternatively, or in addition, server 110 may initiate a separate multimedia conference session for electronic device 103. In this instance, server 110 may store an association between the multimedia conference sessions of electronic devices 102, 103, such that server 110 can determine that the multimedia conference sessions are associated with the same user.

In this instance, since server 110 is able to determine that both multimedia conference sessions are associated with the same user, server 110 may allow the user to have multiple multimedia conference sessions open, even when the multimedia conference is capacity controlled and has reached its maximum capacity. In other words, even though server 110 will not allow new users to initiate a multimedia conference session for the multimedia conference, because the multimedia conference has reached its capacity, server 110 may still allow the user to initiate a second multimedia conference session from electronic device 103.

Alternatively, or in addition, if electronic devices 102, 103 are characterized by different multimedia conference capabilities, server 110 may notify the other electronic devices 104, 106 of the transfer of the user's multimedia conference session. For example, if electronic device 102 is capable of providing a video stream, such as a computer with a camera, but electronic device 103 is not capable of providing a video stream, such as an analog phone, electronic devices 104, 106 may no longer receive a video stream for the user accessing the multimedia conference through electronic device 103. In this instance, server 110 may provide a notification to the other electronic device 104, 106 indicating that the user who was previously accessing the multimedia conference through electronic device 102 has transferred their multimedia conference session to a device that is not capable of providing a video stream, such as electronic device 103, and therefore electronic devices 104, 106 will no longer receive a video stream for the user. In this manner, electronic devices 104, 106 may be made aware that the loss of the video stream for the user is not due to technical problems.

Conversely, if electronic device 102 is not capable of providing a video stream, but electronic device 103 is capable of providing a video stream, server 110 may provide a notification to electronic devices 104, 106 indicating that the user who was previously accessing the multimedia conference through electronic device 102 has transferred their multimedia conference session to a device that is capable of providing video, and therefore a video stream for the user is now available.

Figure 3:
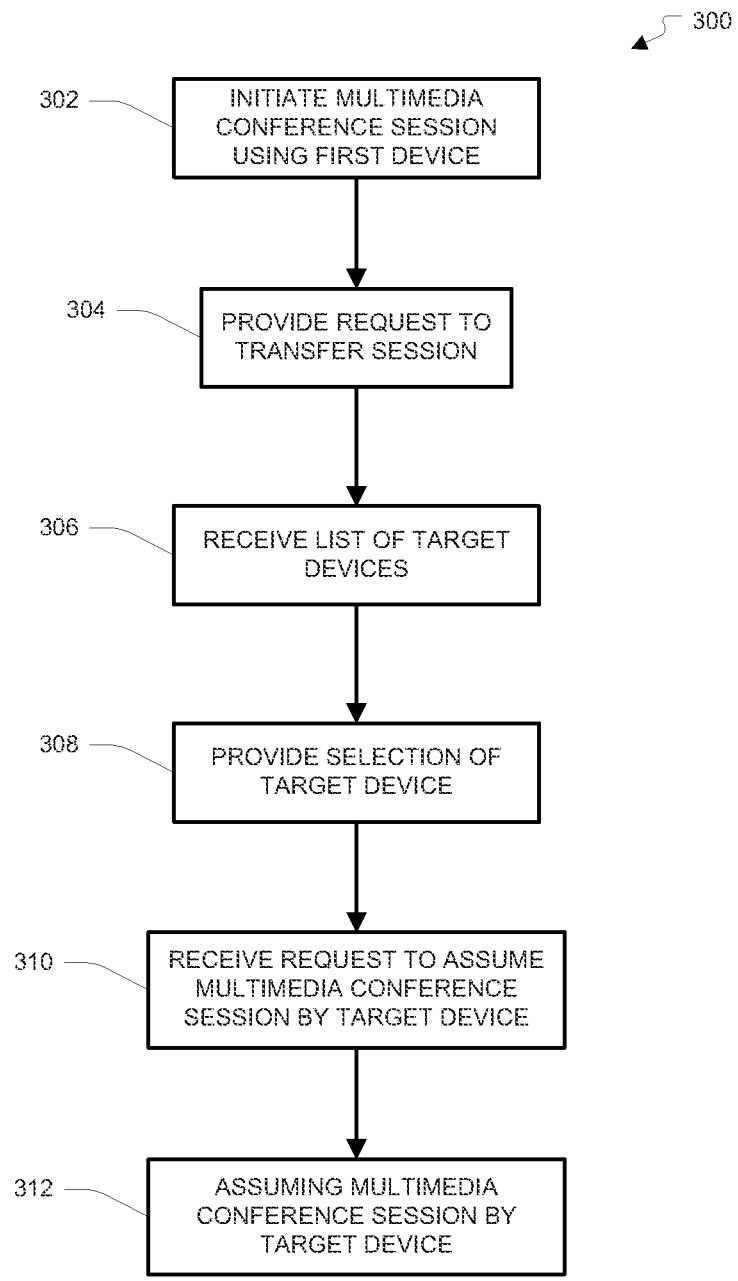
FIG. 3 illustrates a flow diagram of an example process for a multimedia conference endpoint transfer system.

FIG. 3 illustrates a flow diagram of an example process 300 for a multimedia conference endpoint transfer system. In block 302, a user joins a multimedia conference by initiating a multimedia conference session using a first device, such as electronic device 102. For example, the user may initiate the multimedia conference session with server 110. In block 304, electronic device 102 provides a request to server 110 that indicates that the user would like to transfer their multimedia conference session. In block 306, electronic device 102 receives, from server 110, a list of target devices that have been verified as active, such as target devices that have been verified as active by server 110.

In block 308, electronic device 102 provides a selection of a target device from the list of active target devices. For example, the user may select one of the active target devices from the list of active target devices, such as by using an input device of electronic device 102. Alternatively, or in addition, the user may provide contact information, and/or identifying information, for a target device that is not included on the list of active target devices, such as an Internet Protocol (IP) address of a target device, a telephone number of a target device, a Media Access Control (MAC) address of a target device, or generally any information that may be used by server 110 to establish a connection with a target device.

In block 310, the target device, such as electronic device 103, receives a request to assume the multimedia conference session, such as from server 110. In block 312, the multimedia conference session of electronic device 102 is assumed by electronic device 103. For example, the user accessing the multimedia conference through the first device, such as electronic device 102, may accept and/or confirm the transfer request on electronic device 103, such as by clicking an "accept" button on the display of electronic device 103, by pressing a button on a telephone keypad of electronic device 103, or generally via any input mechanism capable of indicating that the user has accepted the transfer on electronic device 103. In response to the user accepting the transfer on electronic device 103, server 110 may modify the endpoint associated with the multimedia conference session to electronic device 103, such that the multimedia conference session is assumed by electronic device 103 from electronic device 102.

Alternatively, or in addition, the request received by electronic device 103 may include an additional option that allows the user to indicate whether they would like to accept the transfer on electronic device 103 by assuming the multimedia conference session from electronic device 102, or to accept the transfer on electronic device 103 and maintain the multimedia conference session on electronic device 102. If the user accepts the transfer on electronic device 103 while maintaining the multimedia conference session on electronic device 102, the user may be able to access the multimedia conference through either electronic devices 102, 103. Alternatively, if the user accepts the transfer by assuming the multimedia conference session on electronic device 103, the multimedia conference session of electronic device 102 may be terminated upon completion of the transfer.

Figure 4:
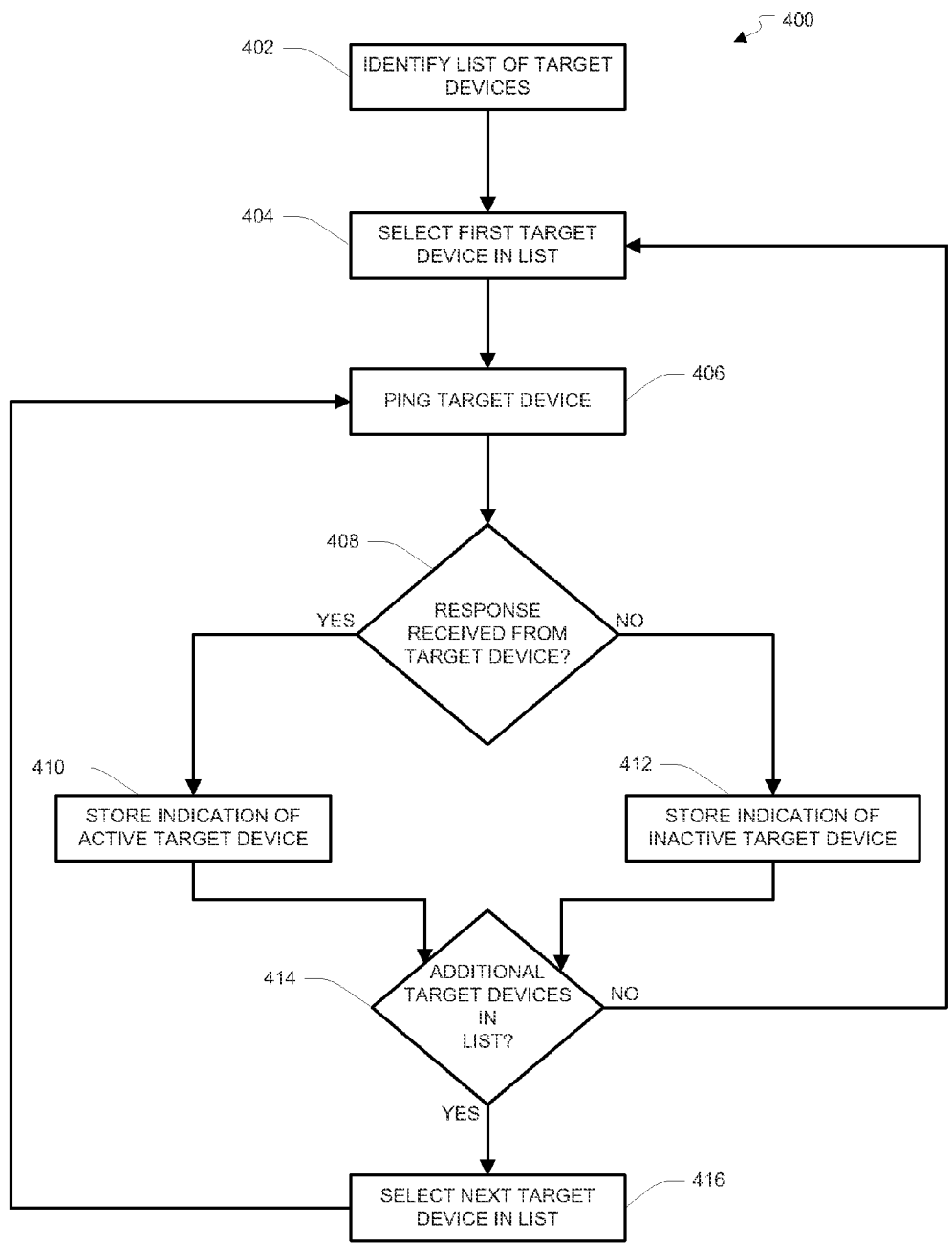
FIG. 4 illustrates a flow diagram of an example process for a multimedia conference endpoint transfer system.

FIG. 4 illustrates a flow diagram of an example process 400 for a multimedia conference endpoint transfer system. In block 402, a device that is responsible for maintaining the state of users' active target devices identifies a list of target devices, such as for one or more users. For example, server 110 may retrieve a list of target devices from data store 114. In block 404, server 110 selects the first target device from the list of target devices. In block 406, server 110 pings the first target device, such as by transmitting a status request message to the first target device.

The term "ping" as used herein encompasses its plain and ordinary meaning and, if not otherwise included in its plain and ordinary meaning, may also refer to any mechanism for determining the state of a target device, such as whether the device is active, e.g. online, or inactive, e.g. offline, and/or any mechanism for determining the multimedia conference capability of a target device.

In block 408, server 110 determines whether a response has been received from the target device. For example, server 110 may wait a determined amount of time, such as a timeout period, for a response from the target device. If, in block 408, server 110 determines that a response has been received from the target device, server 110 moves to block 410. In block 410, server 110 stores an indication that the target device is in an active state, such as in data store 114.

Alternatively, or in addition, server 110 may process the response received from the target device to determine any additional information regarding the state of the target device and/or any additional information regarding the multimedia conference capability of the target device. For example, the status request message sent to the target device may also include a request for the target device to provide its multimedia conference capability. In this example, the response received from the target device may include information regarding the multimedia conference capability of the target device, such as whether the target device can provide an audio and/or video stream, whether the device can receive an audio and/or video stream, the communication interfaces available on the device, processing resources available to the target device, or generally any other attributes of the target device. The response may also include an indication of the channel conditions between server 110 and the target device and/or an indication of the bandwidth available to the target device. Server 110 store any additional information determined from the response, such as in data store 114.

If, in block 408, server 110 determines that a response has not been received from the target device before the expiration of the determined amount of time, such as the timeout period, server 110 moves to block 412. In block 412, server 110 stores an indication that the target device is not presently in an active state, such as in data store 114. In block 414, server 110 determines whether there are any additional target devices in the list of target devices. If, in block 414, server 110 determines that there are additional target devices in the list of target devices, server 110 moves to block 416. In block 416, server 110 selects the next target device in the list of target devices. Server 110 then moves to block 406 and repeats step 406-412 for the next target device.

If, in block 414, server 110 determines that there are no additional target devices in the list of target devices, server 110 moves to block 404. In block 404, server 110 selects the first target device in the list of target devices and repeats blocks 406-416 for the entire list of target devices. Accordingly, server 110, or any other device responsible for maintaining the list of active target devices, continuously repeats blocks 404-416, such as in order to ensure that the users are presented with an accurate list of active target devices.

Alternatively, or in addition, server 110 may pause a determined amount of time, such as a sleep period, before repeating blocks 404-414 for the entire list of target devices. Alternatively, or in addition, server 110 may repeat blocks 404-414 for the entire list on a periodic basis, such as each minute, each hour, etc. In this manner, server 110 may be configured to ping the target devices more or less frequently, as necessary.

For example, server 110 may ping target devices less frequently for target devices whose state does not frequently change, such as dedicated multimedia conference endpoint devices. Conversely, server 110 may ping target devices more frequently for target devices whose state frequently changes, such as mobile devices. Alternatively, or in addition, server 110 may classify each target device based on how often the state of the target device changes, such as based on historical information, or as indicated by an administrator or other user. Server 110 may then ping the target devices classified as having a frequently changing state more frequently than the target devices classified as having a less frequently changing state. In this manner, server 110 may ping the target devices on a given user's list of target devices at non-uniform rates. Alternatively, or in addition, server 110 may ping multiple target devices, such as all of the target devices, in parallel.

IV. Example Multimedia Conference Endpoint Transfer Systems

Figure 5:
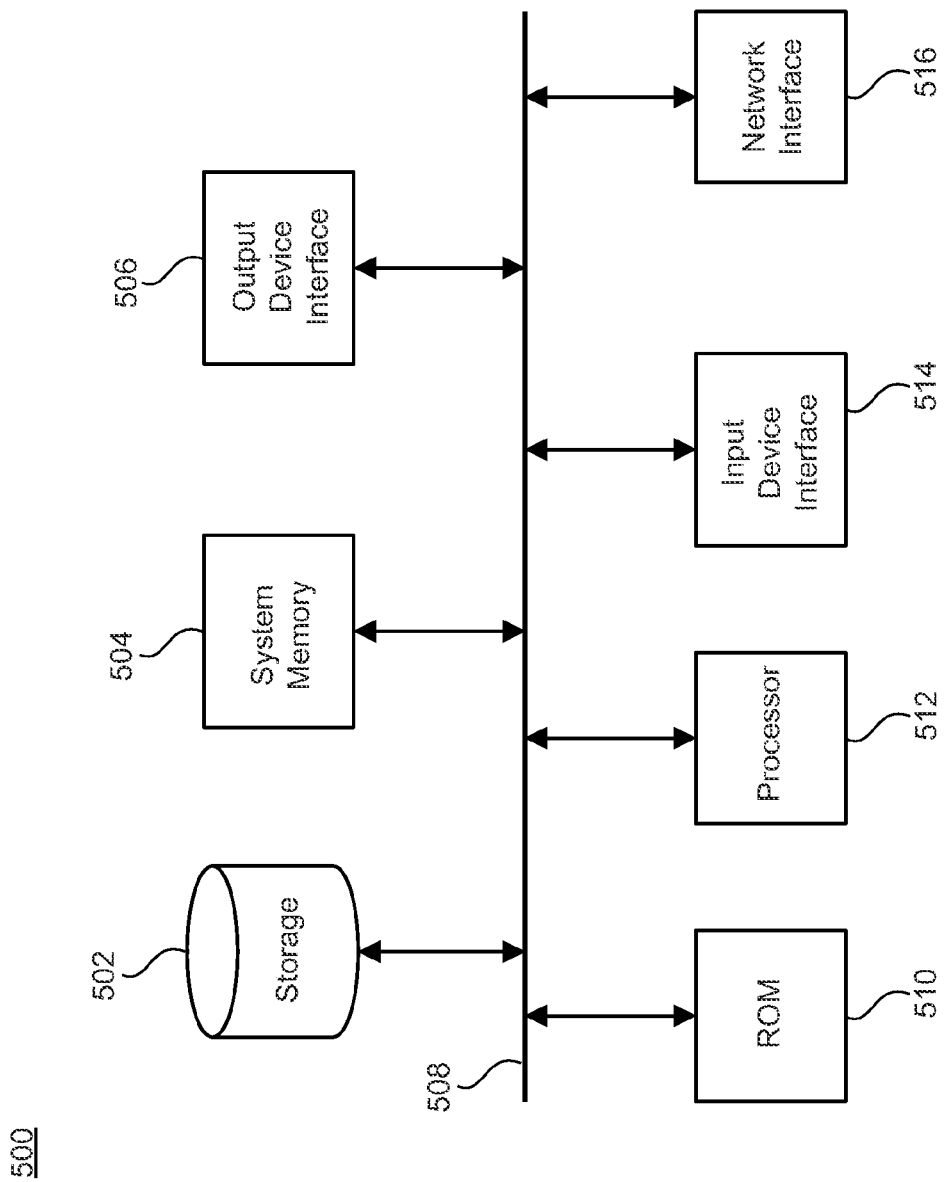
FIG. 5 conceptually illustrates an electronic system with which some implementations of the subject technology may be implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media.

Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units may include instructions for processing, generating, and/or providing verification requests and/or verification responses in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for multimedia conference endpoint transfer, the method comprising:
    providing, using one or more computing devices, a multimedia conference to a plurality of participant devices;
    receiving, using the one or more computing devices, a request to transfer a session of the multimedia conference of a participant device of the plurality of participant devices, wherein the participant device utilizes a first multimedia conference capability to participate in the multimedia conference;
    providing, using the one or more computing devices, a list of a plurality of target devices associated with the participant device to the participant device;
    receiving, using the one or more computing devices, an indication of a target device of the plurality of target devices from the participant device; and
    transferring, using the one or more computing devices, the session of the multimedia conference from the participant device to the target device, the target device utilizing a second multimedia conference capability to participate in the multimedia conference, the second multimedia conference capability differing at least in part from the first multimedia conference capability.

2. The method of claim 1, further comprising:
    monitor, using the one or more computing devices, the plurality of target devices associated with the participant device of the plurality of participant devices to verify whether the plurality of target devices are online, the plurality of participant devices being exclusive of the plurality of target devices.

3. The method of claim 1, wherein each of the plurality of target devices comprises a verified active endpoint.

4. The method of claim 1, wherein the providing, using the one or more computing devices, the multimedia conference to the plurality of participant devices further comprises:
receiving, using the one or more computing devices, a plurality of video streams and a plurality of audio streams from the plurality of participant devices; and
transmitting, in response to receiving each of the plurality of video streams and each of the plurality of audio streams from each of the plurality of participant devices, and using the one or more computing devices, each of the plurality of video streams and each of the plurality of audio streams to the other of the plurality of participant devices.

5. The method of claim 4, wherein the first multimedia conference capability of the participant device comprises providing a first audio stream and a first video stream, and the second multimedia conference capability of the target device comprises providing a second audio stream exclusive of a second video stream.

6. The method of claim 5, wherein the providing, using the one or more computing devices, the multimedia conference to the plurality of participant devices further comprises:
receiving, using the one or more computing devices, the second audio stream of the target device;
transmitting, using the one or more computing devices and in response to receiving the second audio stream from the target device, the second audio stream to the plurality of participant devices; and
transmitting, using the one or more computing devices and in response to receiving each of the plurality of audio streams from each of the plurality of participant devices, each of the plurality of audio streams to the target device.

7. The method of claim 1, further comprising:
establishing, using the one or more computing devices, a connection with the target device;
providing, using the one or more computing devices and in response to the establishing the connection with the target device, a request to transfer the session of the multimedia conference of the participant device to the target device; and
receiving, using the one or more computing devices and in response to the providing the request to transfer the session, an acceptance of the request to transfer the session of the multimedia conference from the target device.

8. The method of claim 7, further comprising:
providing, in response to establishing the connection with the target device, an indication to the participant device that a transfer of the session to the target device has been initiated.

9. The method of claim 1, wherein the providing, using the one or more computing devices, the multimedia conference to the plurality of participant devices further comprises providing, using the one or more computing devices, the multimedia conference to a maximum number of the plurality of participant devices, wherein the multimedia conference is not provided to additional devices when the maximum number of the plurality of participant devices is reached.

10. The method of claim 9, wherein the multimedia conference is being provided to the maximum number of the plurality of participant devices when the request to transfer the session is received.

11. A system, comprising:
one or more processors; and
a memory including instructions that, when executed by the one or more processors, cause the one or more processors to:
provide a multimedia conference to a plurality of participant devices;
receive a request to transfer a session of the multimedia conference of a participant device of the plurality of participant devices, wherein the participant device uses a first multimedia conference capability to access the multimedia conference;
provide for display a list of at least some of a plurality of target devices associated with the participant device to the participant device;
receive an indication of a target device of the at least some of the plurality of target devices from the participant device; and
transfer the session of the multimedia conference from the participant device to the target device, wherein the target device uses a second multimedia conference capability that is different than the first multimedia conference capability to access the multimedia conference.

12. The system of claim 11, the memory further including instructions that, when executed by the one or more processors, cause the one or more processors to:
monitor a plurality of target devices associated with a participant device of the plurality of participant devices to verify whether the plurality of target devices are online, the plurality of participant devices being exclusive of the plurality of target devices, wherein the at least some of the plurality of target devices associated with the participant device have been verified by the monitoring as being online.

13. The system of claim 12, the memory further including instructions that, when executed by the one or more processors, cause the one or more processors to:
monitor the plurality of target devices associated with the participant device of the plurality of participant devices to determine multimedia conference capabilities of the plurality of target devices; and
identify a communication interface that is active on the target device based at least in part on the second multimedia conference capability of the target device that was determined from the monitoring.

14. The system of claim 13, the memory further including instructions that, when executed by the one or more processors, cause the one or more processors to:
establish a connection with the target device via the identified communication interface;
provide, in response to establishing the connection with the target device, a request to transfer the session of the multimedia conference of the participant device to the target device; and
receive, in response to providing the request to transfer the session, an acceptance of the request to transfer the session of the multimedia conference from the target device.

15. The system of claim 14, the memory further including instructions that, when executed by the one or more processors, cause the one or more processors to:
establish a connection with the target device;
provide, in response to establishing the connection with the target device, a request to transfer the session of the multimedia conference of the participant device to the target device; and receive, in response to providing the request to transfer the session, an acceptance of the request to transfer the session of the multimedia conference from the target device.

16. The system of claim 15, the memory further including instructions that, when executed by the one or more processor, cause the one or more processors to:
provide, in response to establishing the connection with the target device, an indication to the participant device that a transfer of the session to the target device has been initiated.

17. A non-transitory machine readable medium embodying instructions that, when executed by a machine, allow the machine to perform a method for multimedia conference endpoint transfer, the method comprising:
providing a multimedia conference to a plurality of participant devices;
receiving a request to transfer a session of the multimedia conference of a participant device of the plurality of participant devices, wherein the participant device is utilizing a first set of multimedia conference capabilities to participate in the multimedia conference;
providing a list of a plurality of target devices associated with the participant device;
receiving an indication of a target device of the plurality of target devices from the participant device; and
transferring the session of the multimedia conference from the participant device to the target device, wherein the target device utilizes a second set of multimedia conference capabilities to participate in the multimedia conference that differs at least in part from the first set of multimedia conference capabilities.

18. The machine readable medium of claim 17, wherein each of the plurality of target devices is verified as being active.

19. The machine readable medium of claim 17, the method further comprising:
establishing a connection with the target device, wherein the plurality of participant devices is exclusive of the target device;
providing, in response to the establishing the connection with the target device, a request to transfer the session of the multimedia conference of the participant device to the target device; and
receiving, in response to the providing the request to transfer the session, an acceptance of the request to transfer the session of the multimedia conference from the target device.

20. The machine readable medium of claim 19, the method further comprising:
providing, in response to establishing the connection with the target device, an indication to the participant device that a transfer of the session to the target device has been initiated.

* * * * *